(12) United States Patent
Balia et al.

(10) Patent No.: US 9,863,200 B2
(45) Date of Patent: Jan. 9, 2018

(54) DEVICE FOR A DOWN-HOLE SEISMIC SOURCE, A SYSTEM COMPRISING THE DEVICE, AND A METHOD FOR USING THE DEVICE AND THE SYSTEM

(71) Applicant: UNIVERSITA' DEGLI STUDI DI CAGLIARI, Cagliari (CA) (IT)

(72) Inventors: Roberto Balia, Cagliari (IT); Gianni Andrea Uda, Cagliari (IT)

(73) Assignee: Universita' Degli Studi Di Cagilari, Cagliari (CA) (IT)

( * ) Notice: Subject to any disclaimer, the term of this patent is extended or adjusted under 35 U.S.C. 154(b) by 398 days.

(21) Appl. No.: 14/404,287

(22) PCT Filed: May 29, 2013

(86) PCT No.: PCT/IB2013/054422
§ 371 (c)(1),
(2) Date: Nov. 26, 2014

(87) PCT Pub. No.: WO2013/179231
PCT Pub. Date: Dec. 5, 2013

(65) Prior Publication Data
US 2015/0159451 A1 Jun. 11, 2015

(30) Foreign Application Priority Data
May 31, 2012 (IT) .............................. CA2012A0006

(51) Int. Cl.
*E21B 28/00* (2006.01)
*F42D 1/08* (2006.01)
(Continued)

(52) U.S. Cl.
CPC .............. *E21B 28/00* (2013.01); *E21B 47/00* (2013.01); *F42D 1/08* (2013.01); *G01V 1/104* (2013.01)

(58) Field of Classification Search
None
See application file for complete search history.

(56) References Cited

U.S. PATENT DOCUMENTS 228,494 A * 6/1880 Valentine .................. F42B 8/02
102/447
2,408,189 A * 9/1946 Baker ....................... F42B 3/00
102/314
(Continued)

FOREIGN PATENT DOCUMENTS

KR 100 867 325 A 11/2008
WO 96/29613 9/1996

OTHER PUBLICATIONS

*Sissy—Seismic Impulse Source System*, GEOSYS, Jul. 10, 2007, XP002691714.
(Continued)

*Primary Examiner* — Caroline N Butcher
(74) *Attorney, Agent, or Firm* — Workman Nydegger

(57) ABSTRACT

A device adapted for a down-hole seismic source in a down-hole in the subsoil and containing water, the device being adapted for introduction into the down-hole and immersion in water, includes: a cartridge-holding head, having a cavity having a number of firing mouths on the side surface of the head, inclined relative to the longitudinal axis of the head towards the operationally lower end of the closed head, the cavity accommodating a cartridge inserted into the upper end of the head; a cartridge percussion system into a sealed body and adapted to cause the explosion of the cartridge, and connected in a top position of the head, the explosion of the cartridge, of the blank-loaded type, causing water to be expelled laterally through the firing mouths when the device is operationally immersed in water within the down-hole.

10 Claims, 3 Drawing Sheets

(51) Int. Cl.
*G01V 1/104* (2006.01)
*E21B 47/00* (2012.01)

(56) References Cited

U.S. PATENT DOCUMENTS

| | | | |
|---|---|---|---|
| 3,599,567 | A | 8/1971 | Graham et al. |
| 4,047,591 | A | 9/1977 | Ward et al. |
| 4,324,310 | A | 4/1982 | Wener et al. |
| 4,712,202 | A | 12/1987 | Chelminski |
| 4,867,266 | A | 9/1989 | Martin |
| 5,555,220 | A * | 9/1996 | Minto .................... E21B 47/00 166/250.01 |
| 6,196,350 | B1 | 3/2001 | Minto |

OTHER PUBLICATIONS

James C. Parker, Jr. et al., *A versatile Shotgun Source for Engineering and Groundwater Seismic Surveys*, Geophysics, vol. 58, No. 10, Oct. 1993, pp. 1511-1516.

International Search Report dated Sep. 20, 2013, issued in PCT Application No. PCT/IB2013/054422, filed May 29, 2013.

\* cited by examiner

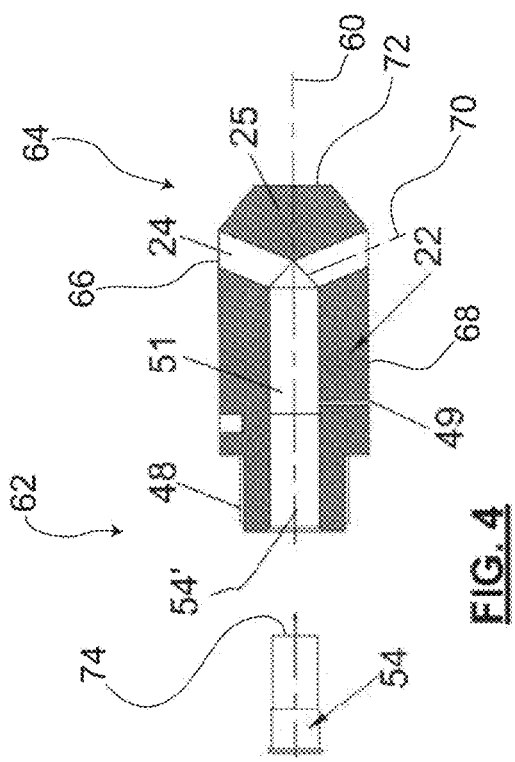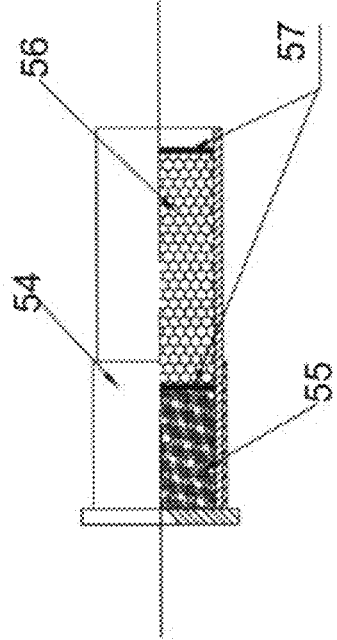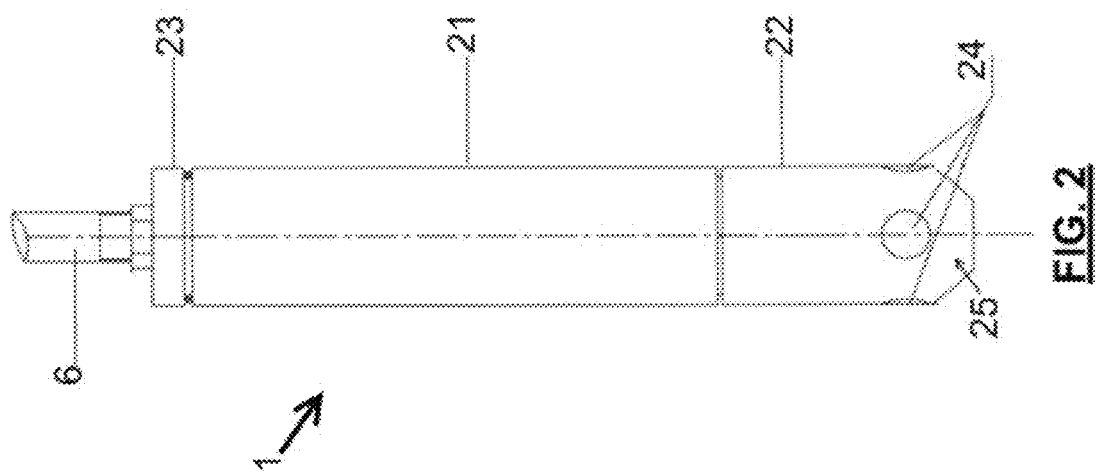

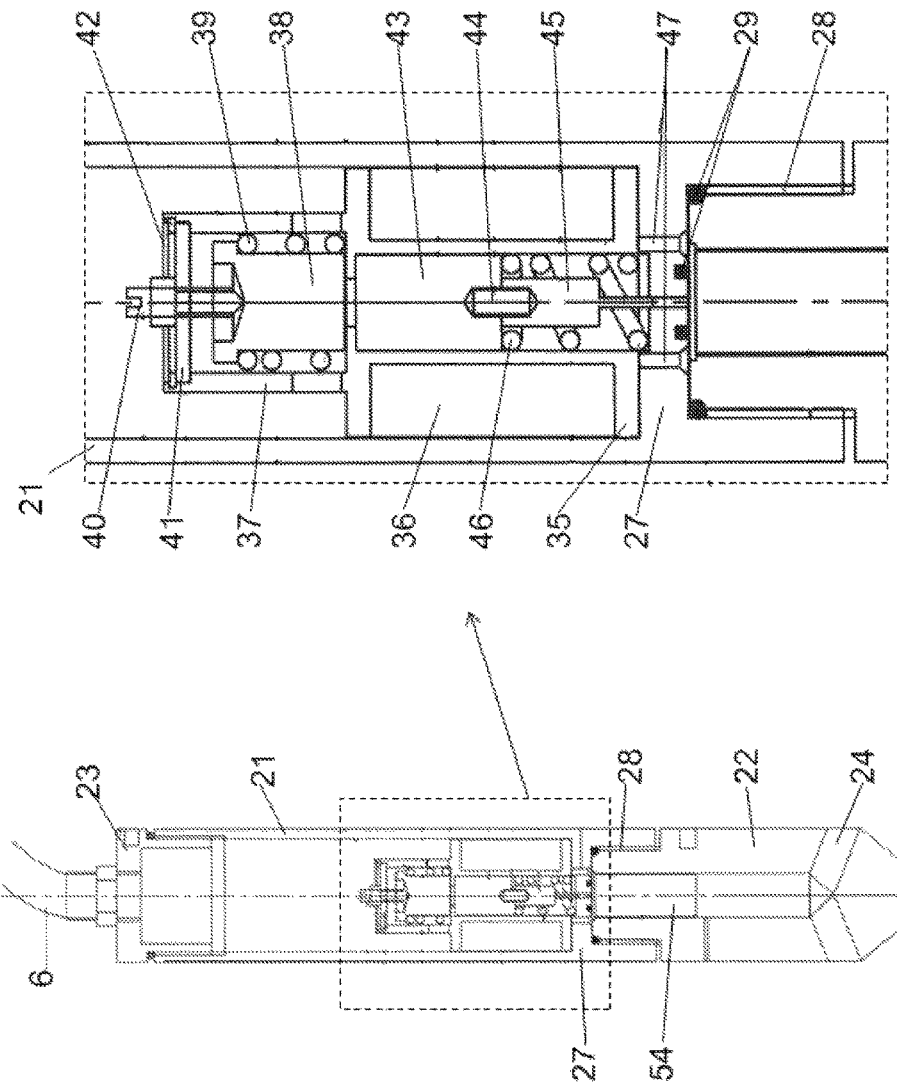

US 9,863,200 B2

DEVICE FOR A DOWN-HOLE SEISMIC SOURCE, A SYSTEM COMPRISING THE DEVICE, AND A METHOD FOR USING THE DEVICE AND THE SYSTEM

FIELD OF THE INVENTION

The present invention relates to a device for a down-hole seismic source, a system comprising the device, and a method for using the device and the system.

BACKGROUND ART

Down-hole seismic sources are used in geophysical prospection techniques, such as cross-hole seismic tomography and up-hole seismic tomography, in order to perform energizations within exploration boreholes.

In-hole seismic prospections allow to calculate the velocity of artificially generated seismic waves and thus to estimate the elastic parameters which are characteristic of the materials that constitute the subsoil, by executing in-hole energizations at different depths and recording the times of arrival of the wavefronts, still at different depths, into one or more holes and/or at multiple points of a clear surface, e.g., the surface of the ground, a slope, or a face. More specifically, the times acquired and the known distances allow to build a distribution map of the values of the speed of propagation of the elastic waves (cross-hole or up-hole seismic tomography, etc.).

Until recently, the only way of executing adequately powerful energizations within an exploration borehole was to use microcharges of explosive material. This practice has now been almost entirely abandoned, at least in the geotechnical field, because of its high costs and of the highly restrictive rules that regulate the use and transportation of explosive materials; as a replacement, alternative seismic sources have been developed which are safer, more economical, and capable of providing high-quality signals.

Said alternative seismic sources are essentially of two types:

compressed-air sources (exploiting the energy associated with the quick escape of pressurized air through suitable nozzles);

sparker-type sources (wherein energy is generated by instantaneous vaporization of a given volume of water caused by an electric arc).

Their use, however, requires the availability of power generators, compressors, hydraulic systems, electric systems with capacitors, and is therefore often uncomfortable, especially in impervious areas.

It must also be pointed out that scientific literature directly concerning the use of these energy sources as well as the advantages and problems thereof is virtually inexistent, since energization is essentially a technical means.

There is therefore a need to provide more effective seismic sources which are easy to use, economical, safe, and not subject to particular restrictions.

SUMMARY OF THE INVENTION

It is therefore one object of the present invention to propose a device for a down-hole seismic source, a system comprising the device, and a method for using the device and the system, which can overcome all of the above-mentioned drawbacks.

The invention relates to a device for a down-hole seismic source which allows to execute lateral energizations within exploration boreholes in accordance with a gas-water interaction principle, wherein gas is generated by explosion of blank-loaded cartridges, e.g., hunting cartridges, and water acts as a projectile.

More in particular, while introducing the device into the exploration borehole drilled into the subsoil, water floods the firing chamber of the device up to the cartridge base. Firing is controlled from above ground by operating a power and control panel, in observance of a safe procedure preventing any risk of accidental shots. The gases released after firing exert a strong overpressure onto the water, i.e., the projectile, which is then violently expelled through the firing mouths of the device and transmits the overpressure to the walls of the exploration borehole, thus providing energization.

In practice, the gases perform a function which is equivalent to that performed by the air jet in compressed-air systems or by instantaneous water vaporization in sparker-type systems. The shot is synchronized with a recording apparatus via a suitable circuit, in order to ensure the utmost accuracy in the estimate of the times of propagation of the elastic waves.

The invention finds useful applications in the civil and environmental engineering fields, e.g., for surveys and explorative drillings to depths of up to 50 m in the subsoil.

The present invention relates to a device designed for a down-hole seismic source, said down-hole being obtained in the subsoil and containing water, the device being adapted for introduction into said down-hole and immersion in water, and comprising: a cartridge-holding head, comprising a cavity ending into a number of external apertures, acting as firing mouths, arranged on the side surface of the head and inclined relative to the longitudinal axis of the head towards the operationally lower end of the head, said end of the head being closed, said cavity being so shaped as to accommodate a cartridge, which can be inserted into the operationally upper end of the head; a cartridge percussion system, inserted in a sealed body and adapted to cause the cartridge to explode, and connected to said head on top of the latter, wherein the explosion of the cartridge, of the blank type, causes water to be expelled laterally through said external apertures when the device is operationally immersed in water within said down-hole.

The present invention also relates to a system for a down-hole seismic source which uses said device.

It is a further object of the present invention to provide a method for gas-water energization of an underground seismic source, which uses said system.

It is a particular object of the present invention to provide a device for a down-hole seismic source, a system comprising the device, and a method for using the device and the system as set out in the appended claims, which are an integral part of the present description.

BRIEF DESCRIPTION OF THE DRAWINGS

Further objects and advantages of the present invention will become apparent from the following detailed description of a preferred embodiment (and variants) thereof and from the annexed drawings, which are only supplied by way of non-limiting example, wherein:

FIG. 2 shows a side view of the device for a down-hole seismic source according to the present invention;

FIG. 3 shows a detailed longitudinal sectional view of the device of FIG. 2;

FIG. 3.1 shows an enlarged view of the part of the device enclosed in the dashed frame of FIG. 3;

FIG. 4 is a sectional view of the cartridge-holding head of the device;

FIG. 5 is a side view and a partial longitudinal sectional view of a cartridge.

In the drawings, the same reference numerals and letters identify the same items or components.

DETAILED DESCRIPTION OF A FEW EMBODIMENTS OF THE INVENTION

Figure 1:
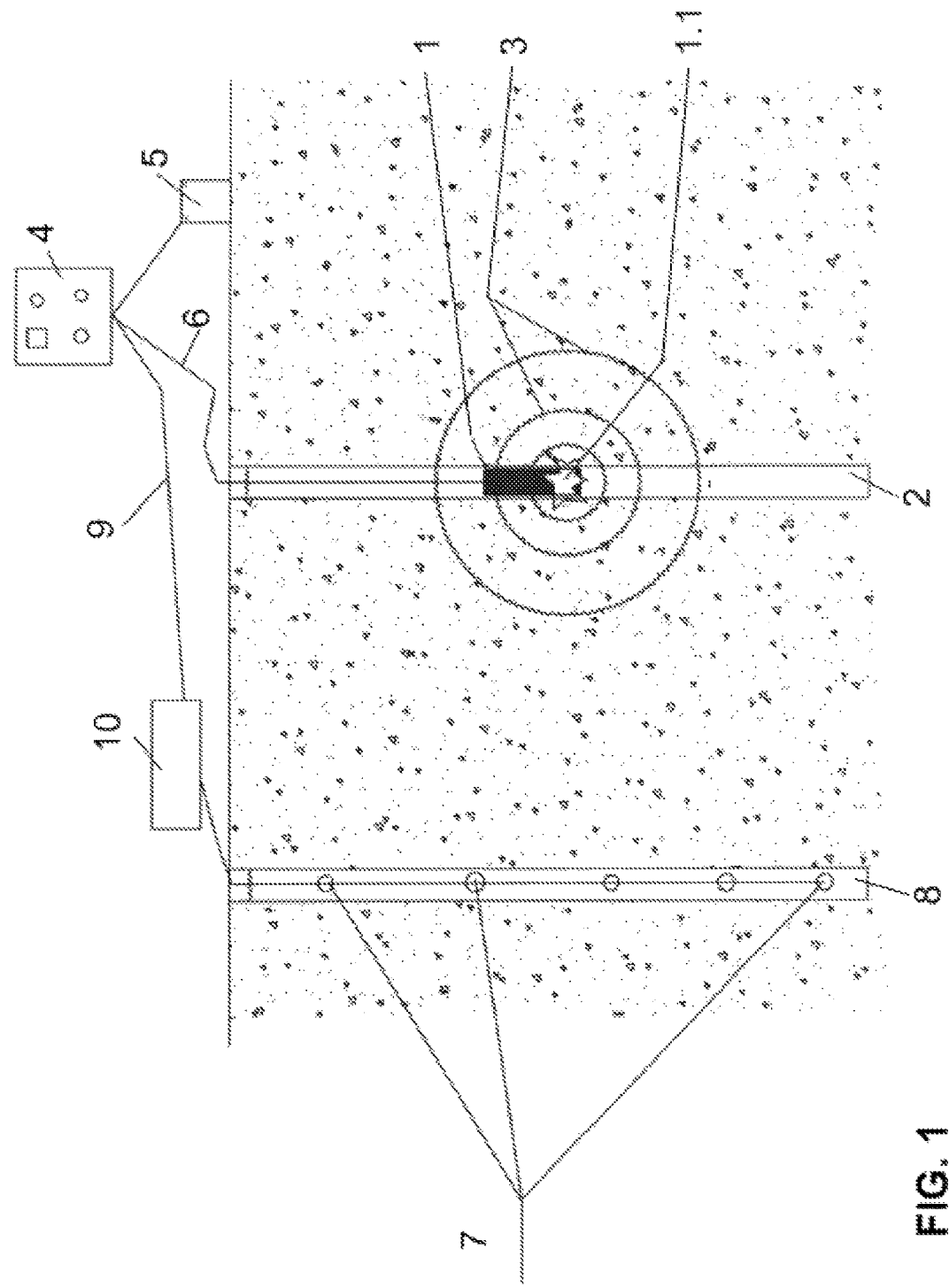
FIG. 1 shows a general diagram of the system for a down-hole seismic source according to the present invention.

FIG. 1 shows one example of utilization of the device according to the invention in an underground energization system for detecting the energization effects.

The device 1 is lowered to a certain depth within a hole 2 drilled in the subsoil, which constitutes the down-hole, and into which, in the absence of any water-bearing strata, water is poured up to a level close to the down-hole mouth; this condition is necessary to optimize the coupling between the energy source and the down-hole walls, to as well as to minimize the wave effects in the air. In loose ground, it is preferable that the down-hole be cased, and that the interspace between the casing and the walls be cemented in order to ensure an optimal coupling.

Numeral 1.1 designates the action of energizing the device.

Numeral 3 designates the wavefronts propagating in the subsoil following energization.

The system comprises: a power and control panel 4; a power supply battery 5; a support and control cable 6 for the device 1, connected to the panel 4; a number of hydrophones 7 and/or geophones, the latter being arranged on the ground, i.e., transducers detecting the elastic pulses generated in the subsoil by the energization produced, arranged at different depths within another hole 8 drilled in the subsoil at a certain distance from the hole or down-hole 2 and/or above ground; an apparatus 10 for acquiring the seismic data detected by the hydrophones 7 and/or geophones; a cable 9 that connects the acquisition apparatus 10 to the control panel 4 for synchronizing ("triggering") the signals detected by the transducers.

In one example of embodiment, the power and control panel 4 is enclosed in a waterproof box, at the sides of which two waterproof connectors are mounted for connecting it to the power supply battery 5 and to the device 10; at the front there are a key-type master switch and two lit push-button switches, suitably spaced to prevent accidental triggering. The apparatus is completed by a battery check voltmeter and an alarm buzzer.

FIG. 2 shows a side view of the device 1.

Numeral 21 designates the device body, which is substantially hollow and waterproof. It is preferably made of AISI 304 stainless steel, and consists of a bored cylinder internally threaded at one end (as also visible in FIG. 3) to allow fitting a closing plug 23. To the latter, the support and control cable 6 is connected.

At the other end, the body 21 is internally threaded to allow for a screwed connection of a cartridge-holding head 22 (also shown in FIG. 3).

In its terminal portion, the cartridge-holding head 22 has a number of external apertures 24 acting as firing mouths, i.e., holes through which water is expelled through the effect of the overpressure generated by the gases released by the exploding cartridge.

The firing mouths are arranged on the side surface of the head at constant angular intervals, and are inclined relative to the longitudinal axis towards the operationally lower end of the head, i.e., the end which is at the bottom when the device is inserted into the down-hole, while said end of the head is closed. In this way, the device will only undergo an upward vertical backing movement (recoil), thus moving away from the debris produced by the energization, which will be pushed downwards and will not block the device within the exploration down-hole 2.

Based on tests carried out, the firing mouths 24 are preferably four, with an angle of inclination relative to the longitudinal axis within a preferred range of 50°-60°, more preferably 60°, towards the operationally lower end of the head. Tests carried out have shown that angular values close to 90° would give rise to a high risk of the device being blocked, whereas small angular values, e.g., 45-30°, would produce excessive recoil, which would lead to dangerous stresses undergone by the cable and to a reduction of the component perpendicular to the down-hole walls.

FIG. 3 shows a detailed longitudinal sectional view of the device 1.

Numeral 21 designates the body of the device; 22 designates the cartridge-holding head (see also FIG. 4); 23 designates the closing plug; 54 designates the cartridge (see also FIG. 4 and FIG. 5).

Inside the body 21 there is a cartridge percussion system, which comprises the following elements (see the enlarged detail of FIG. 3.1).

An electromagnetic coil, comprising a coil housing 35 and electric wire windings 36, with screws 47 for fastening the electric coil housing to the device body; the coil housing has a central cavity.

A synchronization system, comprising an inertial switch for starting the recording of seismic events. In fact, the instant at which energization occurs determines the start of the measurement of the times of arrival of the wavefronts to the various receivers (7 in FIG. 1). The time-based recording of seismic tracks must therefore be started at the very same instant at which explosion of the cartridge occurs, by means of an electric signal generated by the inertial switch when the device is "shaken" by the explosion. In its turn, the inertial switch comprises an external container 37, a preferably cylindrical body 38 made of brass or anyway of a non-magnetic material, so as to not interfere with the electromagnetic part, a return spring 39; an electric contact and adjustment screw 40; a plug 41 for closing the housing of the inertial switch, shaped like an insulating plate; a retainer 42 consisting of a seeger ring (snap ring) for locking the closing plug 41.

A percussion unit, substantially arranged within the central cavity of the coil housing, comprising a body 43 (preferably cylindrical and made of iron); a screw 44 (preferably made of iron) for the connection between the body and a needle-type striker 45, preferably made of AISI 304 stainless steel; a striker return spring 46.

The system is activated through the power and control panel 10 by sending an electric signal which, being transmitted via the support and control cable 6, activates the electromagnetic coil, which causes a pulsed movement of the percussion unit, which in turn strikes against the cartridge and causes it to explode.

Inside the body 21, in a position at approx. $\frac{4}{5}$ of its length starting from the plug 23, there is a septum 27, with a hole at the centre, to one end of which (inside the body 21) the percussion system is connected by means of the coil housing 35, while at the end opposite to the plug an inner thread 28 is provided, which is screwed to the cartridge-holding head 22. At the inner end of the thread 28 two grooves 29 are obtained, where two O-rings are inserted to prevent water from flooding the internal parts as the device is immersed in the water-filled down-hole.

The electromagnetic coil inserted in the body is preferably obtained from a single brass piece turned to a cylindrical shape to form the housing 35, so as to allow winding the electric conductive wire 36.

The turned brass piece constituting the coil is bored internally to allow one end to receive the percussion device and the other end to receive the inertial switch or synchronization system.

As it receives an electric pulse generated by the system, the coil causes the striker to move forwards and strike against the cartridge, thus causing the latter to explode.

The support and control cable 6 of the device is connected to the plug 23 and is adapted to: connect the device to the power and control panel 4; support the device suspended at a certain depth in the down-hole; supply to the device the cartridge explosion command generated by the power and control panel 4; transmit to the panel and to the acquisition apparatus 10 the signal generated by the synchronization system for starting the detection of seismic waves.

FIG. 4 shows a sectional view of the cartridge-holding head 22 and a view of the cartridge 54. As can be observed, the head is hollow on one side, with a bore 54' that allows inserting the cartridge, whereas on the other side the inner cavity (barrel) 51 ends into the lateral firing mouths 24 and the central closure 25. On the cartridge side, the head has a threaded restriction 48 that allows it to be screwed to the body 21 (i.e., to the mating thread 28). Expressed in other terms, cartridge-holding head 22 bounds cavity 51 and has a longitudinal axis 60 that extends between an operationally upper end 62 and an operationally lower end 64. Cavity 51 comprises bore 54' at least partially formed at operationally upper end 62 that is configured to receive cartridge 54. Cavity 51 also comprises the plurality of spaced apart elongated firing mouths 24 that extend from bore 54' to a corresponding mouth opening 66 formed on a side surface 68 of cartridge-holding head 22. Each elongated firing mouth 24 has a longitudinal axis 70 that is inclined relative to longitudinal axis 60 of cartridge-holding head 22 towards operationally lower end 64 of cartridge-holding head 22. Operationally lower end 64 of cartridge-holding head 22 terminates at an end face 72 that is closed to cavity 51.

In the cartridge-holding head 22 there is at least one capillary hole 49 between the inside (the cavity 51) and the outside of the head 22, in a position ahead of the front terminal part 74 of the inserted cartridge 54. The length of the cartridge 54 is therefore determined in a manner such that it will not go past the position of said capillary hole 49. When the device is introduced into the down-hole and immersed into water, this capillary hole 49 allows air to escape and water to enter up to the level of the hole 49 itself, so that the firing mouths 24 and the barrel will get filled with water, which will act as a projectile, while nevertheless not wetting the terminal part 74 of the cartridge 54.

FIG. 5 is a side view and a partial longitudinal sectional view of a cartridge 54. The cartridge comprises a cartridge body containing gunpowder 55, wood sawdust 56 and dividing wads 57.

In one example of embodiment, the cartridge comprises a suitably shortened 12-calibre high-rim case, the explosive charge of which (gunpowder 55) consists of two to five grams of ballistite flake, pressed to 5 kg, with a cardboard separator and wadding 57, and wood sawdust 56 pressed in successive steps until the cartridge is completely full. Finally, the cartridge is closed with a cardboard separator 57 and sealed with resins to make it waterproof.

As far as the method for using the device and the system is concerned, in principle it provides gas-water energization of the seismic source through gas generated by firing blank-loaded cartridges.

The method provides for executing lateral energizations within exploration boreholes in accordance with a gas-water interaction principle, wherein gas is generated by explosion of blank-loaded cartridges, e.g., hunting cartridges, and water acts as a projectile.

In particular, the method comprises the steps of:
a) prearranging the energization down-hole 2 in the subsoil and filling it with water, and prearranging the hole 8, also filled with water, for introducing the hydrophones 7, while any geophones will be positioned on the ground;
b) prearranging the elements of the system according to the invention and the connections thereof;
c) inserting the cartridge into the head of the device, and screwing the head to the body;
d) inserting the device into the down-hole to the desired depth;
e) firing, and recording the signals received by the receivers;
f) extracting the device, removing the case, and possibly inserting a new cartridge and repeating steps c), d) and e).

The above-described embodiment example may be subject to variations without departing from the protection scope of the present invention, including all equivalent designs known to a man skilled in the art.

The elements and features shown in the various preferred embodiments may be combined together without however departing from the protection scope of the present invention.

The advantages deriving from the application of the present invention are apparent.

The features of the device allow for an accurate investigation of the structure of the terrestrial subsoil by means of seismic techniques operating at depths of interest in the engineering-environmental fields.

Especially because of the particular arrangement and shape of the firing mouths, the device will only undergo vertical recoil, and the soil and/or down-hole casing debris produced by the energization will not block the device within the exploration down-hole.

Furthermore, the present invention offers advantages in terms of simplicity of use and good performance and reliability even in comparison with similar devices, in association with more advantageous production and selling costs.

From the above description, those skilled in the art will be able to produce the object of the invention without introducing any further construction details.

The invention claimed is:

1. A device adapted for a seismic source in a down-hole, said down-hole being obtained in the subsoil and containing water, the device being adapted for introduction into said down-hole and immersion in said water, comprising:
    a cartridge-holding head bounding a cavity and having a longitudinal axis that extends between an operationally upper end and an operationally lower end, the cavity comprising a bore at least partially formed at the operationally upper end that is configured to receive a cartridge, the cavity also comprising a plurality of spaced apart elongated firing mouths that extend from the bore to a corresponding mouth opening formed on a side surface of the cartridge-holding head, each of the elongated firing mouths having a longitudinal axis that is inclined relative to the longitudinal axis of the cartridge-holding head towards the operationally lower end of the cartridge-holding head, the operationally lower end of the cartridge-holding head terminating at an end face that is closed to the cavity;

a cartridge percussion system adapted to cause explosion of the cartridge, said cartridge percussion system being inserted into a sealed body and connected to said cartridge-holding head in a position operationally on top of said cartridge-holding head, the explosion of the cartridge, which is of the blank-loaded type, causing water to be expelled laterally through said elongated firing mouths when the device is operationally immersed in water within said down-hole, and causing an upward vertical backing movement of said device.

2. The device according to claim 1, wherein said elongated firing mouths are arranged at constant angular intervals so that the longitudinal axis of the firing mouths is at an angle of inclination relative to the longitudinal axis of the cartridge-holding head in a range of 50°-60° towards the operationally lower end of the cartridge-holding head.

3. The device according to claim 1, wherein in said cartridge-holding head there is at least one capillary hole between said cavity and an outside of the cartridge-holding head, said at least one capillary hole being in a position ahead of a front terminal part of the cartridge when said cartridge is inserted in the cartridge-holding head, said device being configured so that when the device is introduced into the down-hole and immersed into the water, said at least one capillary hole allows air to escape and water to enter up to the level of the at least one capillary hole itself, and said elongated firing mouths get filled with the water, while not wetting the front terminal part of the cartridge.

4. The device according to claim 1, wherein said cartridge percussion system comprises:

an electromagnetic coil having an internally hollow cavity, the electromagnetic coil being adapted to receive an activation command from outside of the device;

a inertial-switch synchronization system, adapted to generate an activation signal for a seismic signal detection system external to the device when it receives said activation command;

a percussion unit, substantially internal to the cavity of the electromagnetic coil, operationally located in proximity to said cartridge when the latter is inserted in the cartridge-holding head, said activation command determining the excitation of said electromagnetic coil and the actuation of said percussion unit, which will strike against the cartridge and cause it to explode.

5. The device according to claim 4, wherein said electromagnetic coil comprises a single brass piece turned to a cylindrical shape to form a housing for an electric conductive wire, said brass piece being bored internally to allow one operationally lower end to receive the percussion unit and an opposing other end to receive the internal-switch synchronization system.

6. The device according to claim 1, wherein said sealed body is substantially hollow and a septum is inserted inside the sealed body, said cartridge percussion system being inserted in the sealed body, integrally connected to one side of the septum, said cartridge-holding head being connected to an opposite side of the septum and being operationally in contact with the cartridge percussion system.

7. A down-hole seismic source system comprising a device adapted for a seismic source in a down-hole according to claim 1, the system further comprising:

a power and control panel;

one or more power supply batteries;

a device support and control cable, said cable being adapted to: connect the device to the power and control panel; support the device suspended at a certain depth in said down-hole; supply to the device a cartridge explosion command generated by said power and control panel; transmit to said power and control panel a synchronization signal generated by said device for starting a detection of seismic waves;

a number of hydrophones and/or geophones, adapted to detect elastic pulses generated in the subsoil by the energization produced by the device, and adapted to be arranged at different depths within a hole drilled in the subsoil at a certain distance from said down-hole;

an apparatus for acquiring seismic data detected by the hydrophones and/or geophones, connected to the power and control panel for synchronizing the signals detected by the hydrophones and/or geophones upon receiving said synchronization signal.

8. A method for gas-water energization of an underground seismic source, said method using a system according to claim 7, and providing for execution of lateral energizations within an underground down-hole in the presence of water, based on a gas-water interaction principle wherein gas is generated by explosion of a blank-loaded cartridge and water acts as a projectile.

9. A device according to claim 1, further comprising the cartridge received within the bore, the cartridge comprising a case with an explosive charge including a quantity of pressed ballistite flake, with a cardboard separator and wadding, and wood sawdust pressed in successive steps until the cartridge is completely full, the cartridge being closed with a cardboard separator and sealed with resins to make it waterproof.

10. The method according to claim 8, comprising the steps of:

a) prearranging said down-hole in the subsoil and filling it with water, and prearranging said hole, also filled with water, for introducing hydrophones, and/or prearranging geophones on the ground;

b) prearranging said system and the connections thereof;

c) inserting a cartridge into said cartridge-holding head of the device, and screwing the head to the body;

d) inserting the device into the down-hole to the desired depth so that at least a portion of the device is immersed in the water;

e) firing the cartridge and recording the elastic pulses detected by said hydrophones and/or geophones;

f) extracting the device, and removing the exploded cartridge.

* * * * *